United States Patent [19]

Boulanger et al.

[11] 4,132,618
[45] Jan. 2, 1979

[54] ELECTROLYTIC DEVICE FOR MARKING METALLIC PARTS

[75] Inventors: Gilbert Boulanger, Aix en Provence; Georges Duret, Manosque, both of France

[73] Assignee: Commissariat a l'Energie Atomique, Paris, France

[21] Appl. No.: 749,652

[22] Filed: Dec. 10, 1976

[30] Foreign Application Priority Data

Dec. 16, 1975 [FR] France .............................. 75 38530

[51] Int. Cl.² .................... C25D 17/00; C25D 17/14
[52] U.S. Cl. .................................. 204/218; 204/224 R
[58] Field of Search ............. 204/224 R, 224 M, 212, 204/206, 218, 228

[56] References Cited

U.S. PATENT DOCUMENTS

| 2,590,927 | 4/1952 | Brandt et al. ................ 204/212 X |
| 3,642,601 | 2/1972 | Kondo ........................... 204/212 X |
| 3,661,752 | 5/1972 | Capper et al. ................... 204/206 |
| 3,679,558 | 7/1972 | Godbehere ................. 204/224 R X |
| 3,706,651 | 12/1972 | Leland ............................. 204/218 |

FOREIGN PATENT DOCUMENTS

188817  11/1966  U.S.S.R. .............................. 204/224 R

Primary Examiner—John H. Mack
Assistant Examiner—D. R. Valentine
Attorney, Agent, or Firm—Thomas R. Boland

[57] ABSTRACT

At least one cylinder having electrically conductive portions and in tangential contact with a metallic tube is associated with a tank filled with electrolyte which is brought to the contact surface between cylinder and tube as a result of rotational motion imparted to the cylinder or to the tube by suitable driving means. An electric current generator is connected to the metallic tube and to at least one of the conductive portions of the cylinder.

7 Claims, 8 Drawing Figures

ELECTROLYTIC DEVICE FOR MARKING METALLIC PARTS

This invention relates to an electrolytic device for marking metallic tubes and especially metallic tubes employed for cladding nuclear fuel elements.

In the nuclear fuel industry, the search for the most suitable materials makes it necessary to mark a large number of metallic tubes at the moment of fabrication in order to facilitate subsequent identification of these latter at the time of testing and inspection which will lead to a definition of their properties as a function of different standards of manufacture.

This marking operation is carried out at the present time by numbering of fuel element cans either in clear or in binary code and consequently entails the need to modify the state of surface of the cladding tube according to the outline of the number to be written.

When choosing a method for writing a number on the cladding tube, it is necessary to take into account certain requirements relating on the one hand to the mode of subsequent identification of said number and on the other hand to the treatments and operations required for subsequent testing and inspection of the tubes.

So far as concerns the mode of identification of the number, this presupposes sufficient modification of the state of surface of the tube to ensure that the number can be read either with the naked eye if it is written in clear or by a reading head if it is written in binary code. However, this modification of the state of surface of the tube must not affect its mechanical properties; in addition, it must be maintained throughout the duration of the tests and must not impair the result of said tests. Thus the methods which have recourse to the use of coloring varnishes or magnetic varnishes cannot be considered as suitable since, in the case of coloring varnishes, the written number would be liable to disappear at the time of a cleaning operation and, in the case of magnetic varnishes, these latter would be liable to produce a disturbing signal at the time of testing by means of a method of magnetic inspection. Furthermore, the choice of a suitable method for marking metallic tubes is also governed by the possibilities of automatic operation of the device for carrying out this method by reason of the large number of tubes to be marked.

A method and a device for marking metallic tubes in binary code as already known. The device described in French Pat. No. 2,148,859 filed on Aug. 6th, 1971 in the name of Commissariat à l'Energie Atomique makes it possible to obtain by micro-sandblasting a very slight surface alteration of the metallic tube to be marked, in a ring configuration.

The rings are formed by directing parallel and equidistant jets of abrasive sand onto the rotating tube, each jet being such as to correspond to one of the digits 0 or 1 in binary code of the number to be written and being deviated or undeviated prior to arrival on the tube, depending on whether it represents either the digit 0 or the digit 1.

The present invention relates to a device for marking metallic tubes by means of an electrochemical process whereby the results obtained are superior to those obtained by the method described in the foregoing in regard to sharpness of definition of the rings.

This electrochemical process consists in modifying the state of surface of the tubes by means of an electrolytic treatment according to the outline of the numbers to be written and makes it possible to obtain a very sharp contrast between the attacked and unattacked zones. This accordingly facilitates subsequent identification of the numbered tube without, however, impairing its mechanical properties while providing it with an inscription which is compatible with the operations and treatments to be subsequently performed on the tubes.

The electrolytic treatment of a metallic part is carried out within an electrolytic cell filled with suitable electrolyte and fitted with an anode and a cathode which are connected to an electric current generator, the metallic part to be treated being intended to constitute one of the electrodes. By passing electric current between the anode and the cathode of the electrolytic cell, the metallic part is subjected to the electrolytic treatment and blackening of the surface of said part is obtained on completion of the operation.

The device in accordance with the invention is primarily directed to the application of this treatment to certain predetermined zones of the metallic tube in order to carry out the writing of a number on the surface of said tube either in clear or in binary code.

To this end, the device for electrolytic marking of a metallic tube in accordance with the invention essentially comprises at least two cylindrical members disposed along parallel horizontal axes and capable of being driven in rotation about their respective axes, said members being constituted respectively by said metallic tube and by at least one cylinder provided with electrically conductive portions. Said cylinder is in tangential contact with said tube and associated with a tank filled with electrolyte so as to ensure that said electrolyte is brought to the contact surface between said cylinder and said tube as a result of rotational motion of said cylinder. The device further comprises a means for driving at least one of said parts in rotation and an electric current generator, and means for connecting said electric current generator on the one hand to said metallic tube and on the other hand to at least one of the conductive portions of said cylinder.

In a first alternative embodiment of the invention, said cylinder is partially immersed in said tank.

In a second atlernative embodiment of the invention, said cylinder is located above the level of electrolyte contained within said tank and the device comprises at least three cylindrical members, the third member being constituted by a drum for the supply of electrolyte which is partially immersed in said tank, said cylinder being in tangential contact on the one hand with said tube and on the other hand with said drum.

By virtue of the judicious arrangement of the cylindrical members of said device, it is thus ensured that a film of electrolyte is brought to the contact surface between the cylinder and the tube by imparting a movement of rotation to the cylinder or both to the drum and to said cylinder. It is thus possible to carry out the electrolytic treatment of the metallic tube solely on those portions of said tube which are in contact with the conductive portions of the cylinder by passing an electric current between the tube and the conductive portions of said cylinder, said portions being each intended respectively to constitute the electrodes of the device.

In accordance with a first embodiment, the device is adapted to the marking of metallic tubes in binary code; in this case the cylinder is constituted by a core of insulating material on which are fitted small rollers intended to form said conductive portions, said small rollers being in tangential contact with said tube or both with said tube and said drum when the device comprises a drum for the supply of electrolyte.

By virtue of this arrangement, one of the digits of the binary system is indicated symbolically by means of rings which can be formed on the surface of the tube by means of the cylindrical members of the device which are driven in rotation and the passage of electric current between the tube and a predetermined number of small rollers of the cylinder.

In a second embodiment, the device is adapted to the marking of metallic tubes in clear and comprises bands of electrical insulating material, each band being previously perforated so as to form a predetermined pattern representing for example one of the digits of the number to be written, each of these bands being interposed between said metallic tube and each conductive portion of said cylinder in order to limit the area of contact between said tube and each conductive portion aforesaid to the outline of said pattern.

As an advantageous feature, each band of insulating material is provided with a plurality of successive digits and the device comprises means for transferring each band aforesaid between said tube and said cylinder in order to ensure that said contact area is limited by each of said digits in succession.

A more complete understanding of the invention will be gained from the following description which is not given in any limiting sense, reference being had to the accompanying drawings, wherein:

Figures 1, 3:
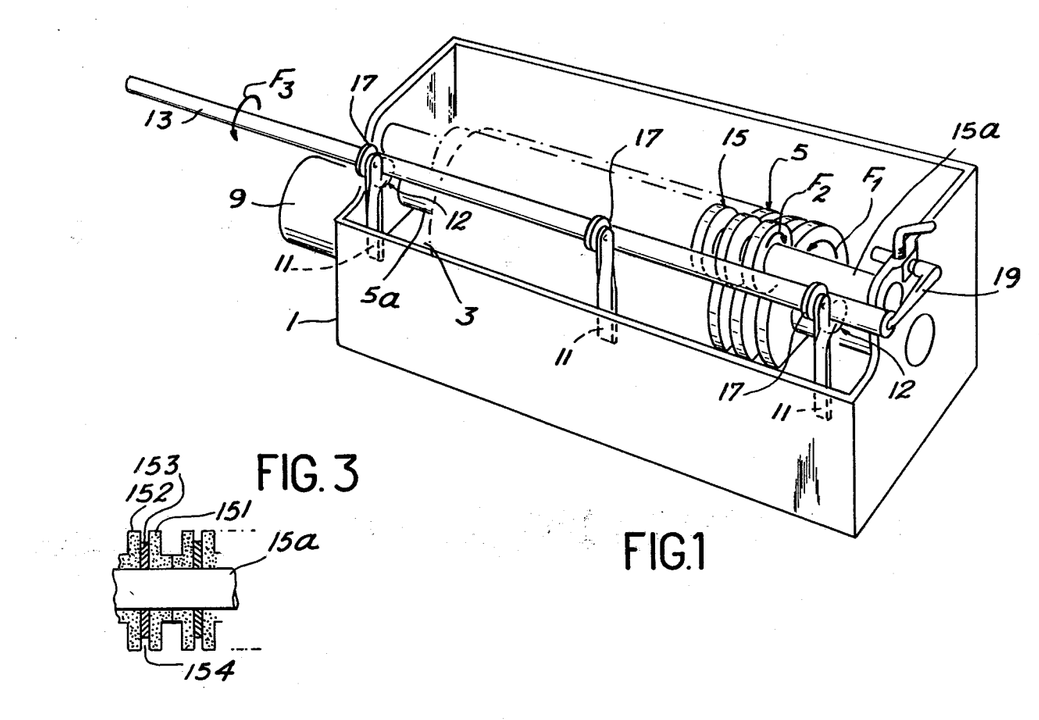
FIG. 1 is a view in perspective showing a device for marking metallic tubes in binary code and comprising three cylindrical members.
FIG. 3 is a vertical sectional view of one of the small rollers 15b of the cylinder 15 shown in FIG. 1.

Reference being made to FIG. 1, there is shown a tank 1 of parallelepipedal shape and filled with an electrolytic liquid 3 in which is partially immersed a cylindrical member 5 constituting the electrolyte supply drum of the device. The drum 5 is placed horizontally within the interior of the tank 1 and comprises an axial shaft 5a for driving said drum in rotation.

The shaft 5a is coupled to a motor 9 located outside the tank 1 and can be driven in rotation by said motor. The metallic tube 13 to be marked is placed parallel to the axis of the supply drum 5 above the level of the electrolyte 3 contained within the tank 1 and is supported by rollers 12 which are mounted on support brackets 11 carried by the front wall of the tank 1. The rollers 12 permit free rotation of the tube 13 about its axis.

A cylinder 15 which is placed parallel to the axes of the drum 5 is mounted on the opposite side walls of the tank 1. Said cylinder 15 is capable of freely rotating about its axis and is located above the level of the electrolyte 3 contained in the tank 1 while being in tangential contact on the one hand with the metallic tube 13 and on the other hand with the electrolyte supply drum 5. The metallic tube 13 to be marked is maintained in tangential contact with the cylinder 15 by means of small pressure-wheels 17 which serve to apply said tube against the surface of said cylinder. Furthermore, the metallic tube 13 is maintained in the longitudinal direction by means of an adjustable stop 19 which is rigidly fixed to one of the side walls of the tank 1.

Figure 2:
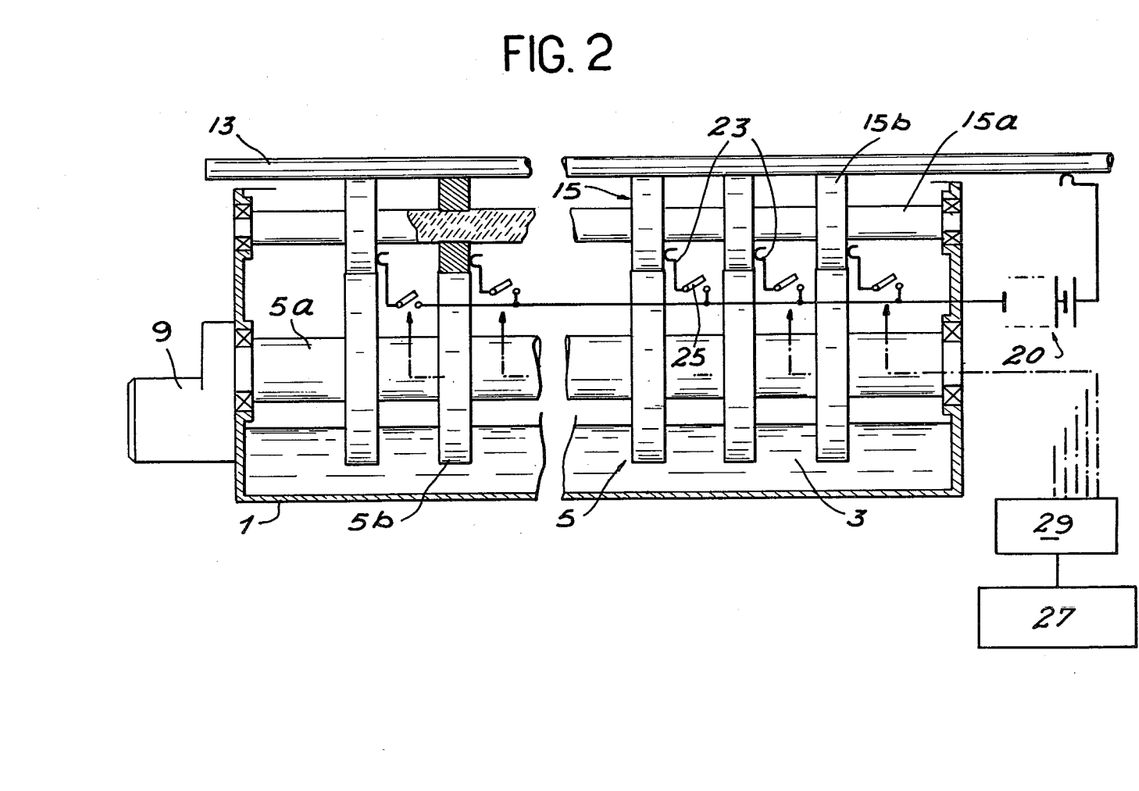
FIG. 2 is a vertical sectional view of the device shown in FIG. 1.

Referring to FIG. 2, the structure of the supply drum 5 and of the cylinder 15 as well as the mode of supply of electric current to the device are shown in greater detail in this figure. The electrolyte supply drum 5 comprises the shaft 5a which is formed of electrical insulating material. Conducting rollers 5b are mounted on said shaft 5a and relatively spaced at equal distance along the length of this latter. The conducting rollers 5b are partially immersed in the electrolytic liquid 3 whilst the shaft 5a is located above the level of said liquid 3. The cylinder 15 is also constituted by a core 15a of electrical insulating material, there being mounted on said core small rollers 15b which are intended to form the electrically conductive portions of the cylinder 15 and are relatively spaced at equal distance along the length of the core 15a. Each small roller 15b is in tangential contact with the metallic tube 13 and is also in tangential contact with one of the conducting rollers 5b of the electrolyte supply drum 5.

In this example of construction, the dimensions of the small rollers 15b and of the conducting rollers 5b are such that each small roller 15b corresponds to a conducting roller 5b. Other forms of construction may be contemplated, especially in regard to the dimensions and relative spacing of the conducting rollers 5b on the shaft 5a, provided that each small roller 15b is in tangential contact with a conducting roller 5b. It is possible to choose small rollers 15b having different widths in order to mark any one tube with different widths of rings.

The device is supplied with alternating current by means of an electric current generator 20 which is connected on one hand to the metallic tube 13 and on the other hand in parallel to each of the small rollers 15b of the cylinder 15 by means of sliding contacts 23; the current supply lines which connect the electric current generator 20 to each of the small rollers 15b are fitted with switches 25. Closure of said switches is initiated from the control desk 27 by means of the logic system 29 whereby electric current can be supplied selectively to each of the small rollers 15b.

Preferably and as shown in FIG. 3, said small rollers 15b are of composite structure and each have two cheeks 151 and 152 of electrical insulating material such as bakelite, for example. There is inserted between said cheeks a metal disc 153 of stainless steel, for example, and having a diameter which is slightly smaller than that of the cheeks 151 and 152 so as to form a groove 154 of very small depth of the order of 0.3 mm, for example, thereby retaining a sufficient volume of electrolyte under the action of capillarity.

By virtue of this roller structure, the supply of electric current to each of the small rollers 15b is carried out by means of sliding contacts 25 on the discs 153.

In an alternative embodiment, the small rollers 15b can each be constituted by a central portion of felt or of nylon which is capable of impregnation with electrolyte, a metallic cheek being placed on each side of said central portion.

When the arrangement of small rollers 15b and conducting rollers 5b is adopted as illustrated in FIG. 2, the electrical insulation between two adjacent small rollers 15b can advantageously be improved by subdividing the tank 1 filled with electrolyte into adjacent compartments which are electrically insulated from each other, the number of these compartments being equal to the number of rollers. Thus, each conducting roller 5b is partially immersed in a volume of electrolyte which is electrically insulated from the electrolyte of the adjacent compartments in which the adjacent conducting rollers 5b are immersed.

The operation of the device is as follows. The tank 1 being filled with a suitable electrolyte, the metallic tube 13 to be marked is placed in position on the supporting rollers 12 after first adjusting the position of the stop 19. When the metallic tube to be marked is of stainless steel, it is an advantage to employ an electrolyte consisting either of a mixture of buffered nitric acid, phosphoric acid and hydrofluoric acid or a dilution of oxalic acid which is almost neutralized.

There is then displayed on the control desk 27 the number which it is desired to write on the metallic tube 13. By means of a logic system 29, the positions of the switches 25 are set automatically as a function of the displayed number in order to supply electric current or not to the small rollers 15b which correspond either to the digits 1 or to the digits 0 of the number to be written in binary code. Each small roller 15b represents one digit of the number to be written and is supplied with electric current or not, depending on whether it represents either one or the other of the digits of the binary code in order to ensure that all the small rollers may display the series of digits which make up said number in binary code.

By starting-up the motor 9, the supply drum 5 is caused to rotate in the direction indicated by the arrow F1 in FIG. 1. By being applied in contact with the cylinder 15, the drum 5 drives said cylinder in rotation in the opposite direction as indicated by the arrow F2 in FIG. 1 and the metallic tube 13 is also driven in rotation in the direction of the arrow F3.

By virtue of the reciprocal movement of rotation of the supply drum 5 and of the cylinder 15, the external surface of the conducting rollers 5b which are partially immersed in the electrolytic liquid 3 is progressively charged with electrolytic liquid and the conducting rollers 5b transmit said liquid to the corresponding small rollers 15b with which they are in tangential contact, thus bringing the electrolytic liquid derived from the tank onto the small rollers 15b which are in turn charged with electrolytic liquid. As a result, the contact surfaces between the metallic tube 13 and the small rollers 15b are also provided with electrolytic liquid and the passage of electric current between said metallic tube 13 and the small rollers 15b which have previously been connected to the generator 20 carries out an electrolytic treatment of the zones of the metallic tube 13 in contact with the small rollers 15b which are supplied with electric current. By reason of the rotation of the metallic tube 13 about its own axis, this treatment is continued around the periphery of the tube, thus obtaining blackened rings on the surface of the tube.

Said rings indicate symbolically one of the digits of the binary system, namely either the digit 1 or the digit 0 whilst the other digit is represented symbolically by the state of surface of the tube which is not subjected to the electrolytic treatment. Thus, if it is postulated that the rings represent the digits 1 of the binary system, the respective location of said rings at the surface of the tube determines the position of each digit 1 which constitutes the number to be written and those locations of the tube surface corresponding to the small rollers 15b which are not supplied with electric current determine the positions of the digits 0 of said number.

As an advantageous feature, the first and the last small roller of the device are always supplied with electric current in order to print a ring at each end of the tube. These two rings serve as references for the optical reading device at the time of identification of the number which is written between the two end rings.

Good results have been obtained by means of this apparatus for marking stainless steel tubes by employing the electrolytes mentioned above with an alternating-current generator at a voltage of 8 volts and a current intensity of 1.2 amp.

The rings obtained offer a better contrast than in the case of rings obtained by sandblasting and the written number can readily be identified, for example by means of the reading device described in French Pat. No. 2,148,859 filed on Aug. 6th, 1971 in the name of Commissariat à l'Energie Atomique.

Figures 4, 5, 6:
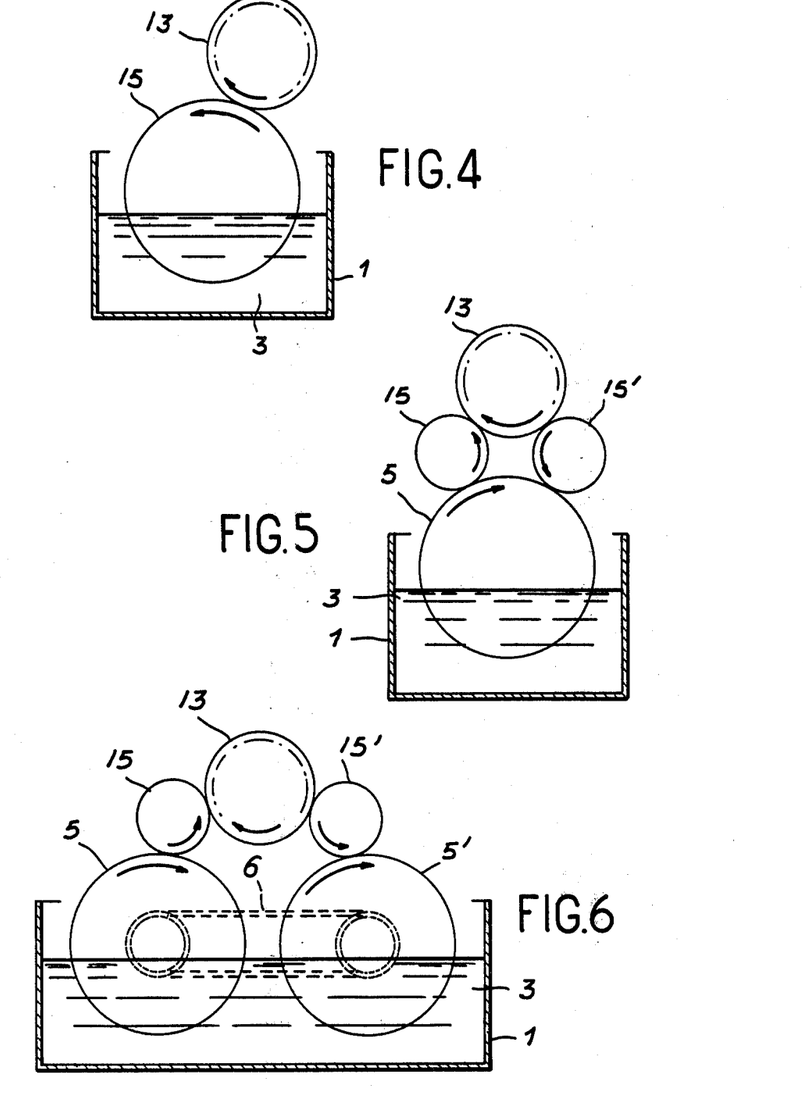
FIGS. 4, 5, 6 are vertical sectional views of the devices comprising respectively two, four and five cylindrical members.

Referring now to FIGS. 4, 5, 6, there are shown other alternative embodiments of this device which relate in particular to the number and arrangement of the cylindrical members constituted either by the metallic tube or by the cylinder, or by the drum for supplying electrolyte.

In all these alternative embodiments, the various cylindrical members are arranged along parallel horizontal axes and are intended to be driven in rotation about their respective axes.

In FIG. 4, the device comprises two cylindrical members constituted respectively by the metallic tube 13 to be marked and by the cylinder 15, said cylinder being partially immersed in the tank 1 which is filled with electrolyte and being in tangential contact with the metallic tube 13.

In this device, the cylinder 15 which is provided with electrically conductive portions performs the function of electrode but also makes it possible by rotational motion to convey a film of electrolyte to the contact surface between the cylinder 15 and the metallic tube 13.

When the electrically conductive portions of the cylinder 15 are constituted by small rollers, it can also be an advantage to subdivide the tank 1 into compartments which are electrically insulated from each other so as to ensure that each compartment corresponds to a single small roller which is partially immersed in the electrolyte contained therein, each small roller being thus more effectively insulated electrically from the adjacent rollers.

In FIG. 5, the device comprises four cylindrical members constituted respectively by the metallic tube 13, two cylinders 15 and 15' and an electrolyte supply drum 5 partially immersed in the tank 1 which is filled with electrolyte. Each of the two cylinders 15 and 15' is in tangential contact on the one hand with the metallic tube 13 and on the other hand with the supply drum 5.

The cylinders 15 and 15' are each provided respectively with electrically conductive portions advantageously constituted by small rollers as in the case of FIG. 1 and the small rollers of the cylinders 15 and 15' are disposed respectively at intervals on the surface of these latter so as to be relatively displaced in the direction of the axis of the metallic tube 13 in order to ensure that each small roller of the cylinders 15 and 15' is capable individually of printing a blackened ring on the surface of the metallic tube 13.

By virtue of this staggered arrangement of the small rollers of the cylinders 15 and 15', it is thus possible to form very closely spaced rings on the metallic tube 13.

In FIG. 6, the device comprises five cylindrical members constituted respectively by the metallic tube 13, a first cylinder 15, a second cylinder 15', a first drum 5 and a second drum 5'. The two drums 5 and 5' are partially immersed in the tank 1 which is filled with electrolyte and provided with a suitable means such as a driving belt 6 for synchronizing their movements of rotation.

The cylinder 15 is in tangential contact on the one hand with the metallic tube 13 and on the other hand with the drum 5. The cylinder 15' is in the tangential contact on the one hand with the metallic tube 13 and on the other hand with the drum 5'.

As in the case of FIG. 5, each of the cylinders 15 and 15' is provided with electrically conductive portions advantageously constituted by small rollers. These rollers are disposed respectively at intervals on the cylinders 15 and 15' so as to be relatively displaced in the direction of the axis of the metallic tube 13.

It is thus possible in exactly the same manner to form very closely spaced rings on the surface of the metallic tube 13.

Since the principle of operation of all these devices is identical with that described earlier in connection with FIGS. 1 and 2, it need only be noted briefly that in each figured example, the electric current generator is connected to the metallic tube 13 and to the conductive portions of the cylinder or cylinders 15. By causing the rotation of at least one of the cylindrical members of said devices, the other members of the device are driven in rotation in the direction indicated by the arrows mentioned in each figure; this makes it possible as in the previous instance to convey a film of electrolyte onto the contact surfaces between the metallic tube 13 and the cylinder or cylinders 15. In the same manner, by passing electric current between the rotating metallic tube 13 and the conductive portions of the cylinder or cylinders 15, blackened rings are accordingly printed on the surface of the metallic tube 13.

Figures 7, 8:
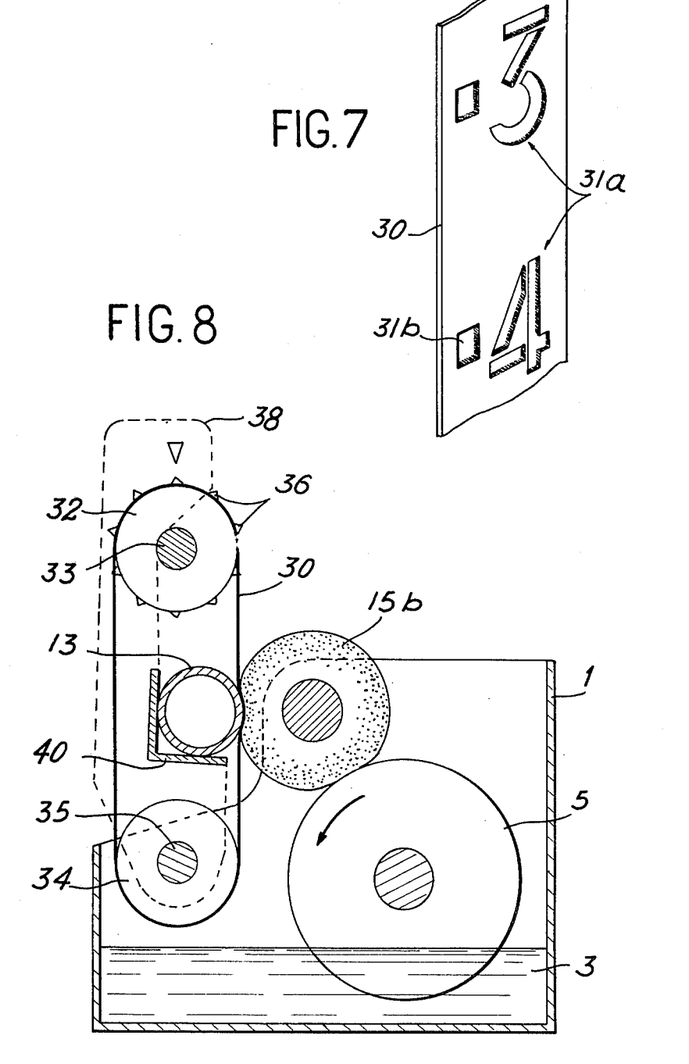
FIG. 7 is a vertical sectional view of a device for marking metallic tubes in clear and comprising three cylindrical members.
FIG. 8 is a view of a band of insulating material which has been perforated so as to form the digits to be written.

Referring now to FIG. 7, there is shown an embodiment of a device which is similar to that of FIG. 1 and more especially adapted to the marking of metallic tubes in clear. In this form of construction, the device is provided in addition with bands 30 of electrical insulating material, each band being interposed between a small roller 15b of the cylinder 15 and the metallic tube 13 to be marked.

Said bands 30, one of which is illustrated in FIG. 8, have previously been preforated so as to form digits 31a by means of an electromagnetically-propelled hammer. Said bands are also provided with holes 31b in order to facilitate their engagement on a suitable supporting means. Each band 30 is arranged in a closed loop at right angles to the axis of the metallic tube 13 and is supported by two driving rollers 32 and 34 which are capable of rotating about their respective shafts 33 and 35 and placed on each side of the metallic tube 13.

The driving roller 32 is provided with studs 36 which correspond to the holes 31b of the band 30 in order to ensure engagment of the band 30 on the driving roller 32 and guiding of said band at the time of rotation of the rollers 32 and 34.

The system for supporting the metallic tube 13 to be marked is modified accordingly in order that said bands 30 can be placed between the metallic tube 13 and the small conducting rollers 15b.

To this end, each side wall of the tank 1 is provided with a vertical cheek 38 shown in chain-dotted lines and fixed on said side wall at the level of the shaft 35 of the driving roller 34, each cheek 38 being capable of pivoting freely about said shaft 35. The two cheeks 38 support the upper horizontal shaft 33 on which are mounted the driving rollers 32 and the lower horizontal shaft 35 on which are mounted the driving rollers 34. A means 40 for supporting the metallic tube 13 is placed horizontally between these two shafts and attached at each end of each cheek 38. In this embodiment, the cylinder 15 further comprises a core of insulating material on which are mounted small conducting rollers 15b, each conducting roller being located opposite to a band of insulating material 30 and having a width which is equal at a maximum to that of the bands of insulating material. In consequence, the number of driving rollers 32 or of corresponding driving rollers 35 is equal to the number of small conducting rollers 15b and they are arranged respectively in spaced relation on the shafts 33 and 35 so as to have a pitch which is identical with that of the small conducting rollers 15b, thereby ensuring that each roller 15b is in contact with a band 30 of insulating material.

The number of small conducting rollers 15b is equal to the number of digits forming the number to be written and is equal to 5, for example when the apparatus is designed to locate 99,999 tubes individually.

The method adopted for supplying current to the device is similar to that of FIG. 2 but does not call for the presence of switches 25 in the lines which connect each of the small conducting rollers 15b to be electric generator 20 since all the conducting rollers are supplied with electric current at the time of marking of the tubes.

The operation of this device takes place as follows: in the first place, the complete assembly constituted by the two cheeks 38, the support 40 for the tubes to be marked and the shafts for supporting the driving rollers 32 and 34 of the bands 30 of insulating material are outwardly displaced in pivotal motion away from the tank 1 in order to suppress any contact between the bands 30 and the conducting rollers 15b of the cylinder 15.

The metallic tube 13 to be marked is placed on the support 40 and the position of each band 30 is adjusted by actuating the driving rollers 32 in such a manner as to ensure that the digits to be written on the metallic tube 13 are centered on the zones of contact between the metallic tube 13 and each band 30.

The motor 9 is started up in order to drive the electrolyte supply drum 5 and the cylinder 15 in rotation. As in the previous instance, this movement of rotation of the drum 5 and of the cylinder 15 ensures the transfer of electrolytic liquid to the surface of the small conducting rollers 15b and these latter are progressively impregnated with electrolytic liquid. When the surface of said rollers has been impregnated to a sufficient extent, the motor 9 is stopped and the complete assembly of the two cheeks 38 is caused to pivot so as to bring the metallic tube 13 back into contact with the small conducting rollers 15b, the bands 30 of insulating material being interposed between the small rollers 15b and the metallic tube 13. At this moment, the small rollers 15b and the metallic tube 13 which constitutes the anode are connected to the electric current generator. The passage of the electric current between the metallic tube 13 and each small roller 15b has the effect of subjecting the metallic tube 13 to an electrolytic treatment on those portions of said tube which are in contact with the electrolytic liquid used for impregnating the surface of the rollers 15b, namely along the outline of the perforation of each band 30 of insulating material which represents the digit to be written. On completion of the operation, the electric current it cutoff and the assembly consisting of both cheeks 38 is displaced in pivotal motion in order to permit disengagement of the metallic tube 13, the desired number having been written on the surface of said tube.

The apparatus can further comprise a system for automatically regulating the feed of each band 30 of insulating material. Thus, for purpose of marking the following tube, said bands are positioned so as to print on this latter the number of the previous tube increased by one unit.

Good results have been obtained with this apparatus for marking five digits on stainless steel tubes by means of the electrolytes mentioned earlier, this being achieved by making use of a direct-current generator at a voltage of the order of 10 volts and a current intensity of 0.8 amp.

What we claim is:

1. An apparatus for electrolytically marking a metallic tube comprising,
a tank adapted to contain an electrolyte,
a cylinder member including a core of electrical insulating material and rollers mounted on said core, each of said rollers including a rim surface portion adapted to be charged with electrolyte, and a metallic part recessed from said rim surface but in contact with electrolyte when retained on said surface,
said cylinder member being disposed at least partially within the tank along a horizontal axis and adapted to be driven in rotation about said axis, said cylinder member further being adapted so that said rollers are partially immersed in electrolyte when contained in the tank and charged with electrolyte upon rotation of the cylinder member,
means adapted to bring the metallic tube to be marked in contact with the electrolyte retained on said rollers when said rollers are charged with electrolyte, and means to maintain said tube free in rotation about its axis,
means adapted to drive said cylinder member and said tube in rotation,
contact means to connect an electric current generator to said metallic tube and to the metallic part of each of said rollers, and
means adapted to selectively supply current to the metallic part of each of said rollers.

2. An apparatus for electrolytically marking a metallic tube comprising,
a tank adapted to contain an electrolyte,
at least one drum member being disposed at least partially within the tank along a horizontal axis and adapted to be driven in rotation about said axis, said drum member further being adapted to be partially immersed in electrolyte when contained in the tank,
at least one cylinder member including a core of electrical insulating material and rollers mounted on said core, each of said rollers including a rim surface portion adapted to be charged with electrolyte, and a metallic part recessed from said surface but in contact with electrolyte when retained on said surface,
said cylinder member being disposed along a horizontal axis above the level of electrolyte when contained in the tank and adapted to be driven in rotation about said axis,
said rollers being in tangential contact with said drum member so that, upon rotation, the drum member will transmit electrolyte from the tank to said rollers,
means adapted to bring the metallic tube to be marked into contact with the electrolyte retained on said rollers when said rollers are charged with electrolyte, and means to maintain said tube free in rotation about its axis,
means adapted to drive said cylinder member, said drum member, and said tube in rotation,
contact means to connect an electric current generator to said metallic tube and to the metallic part of each of said rollers, and
means adapted to selectively supply current to the metallic part of each of said rollers.

3. An apparatus for electrolytically marking a metallic tube according to claim 2 wherein said apparatus comprises four cylindrical members, said members being constituted respectively by said metallic tube, by said drum member for the supply of electrolyte, and by two cylinder members, each of said cylinder members including a core of electrical insulating material and rollers mounted on said core, each of said rollers including a rim surface portion adapted to be charged with electrolyte, and a metallic part recessed from said rim surface but in contact with electrolyte when retained on said surface, said rollers being in tangential contact with said tube and with said drum, and arranged on said core so as to be relatively displaced in the direction of the axis of said tube.

4. An apparatus for electrolytically marking a metallic tube according to claim 2 wherein said apparatus comprises five cylinder members, said members being constituted respectively by said metallic tube, by a first drum member and a second drum member for the supply of electrolyte, and by a first cylinder member and a second cylinder member, each of said cylinder members including a core of electrical insulating material, and rollers mounted on said core, each of said rollers including a rim surface portion adapted to be charged with electrolyte and a metallic part recessed from said rim surface but in contact with electrolyte when retained on said surface, the rollers mounted on said first cylinder member being in tangential contact with said tube and with said first drum member, the rollers mounted on the second cylinder member being in tangential contact with said tube and with said second drum member, the rollers on each of said cylinder members being arranged so as to be relatively displaced in the direction of the axis of said tube.

5. An apparatus according to claim 2 wherein each of said drum members is constituted by a shaft of electrical insulating material and relatively spaced drum rollers mounted thereon along the length of said shaft, each of said drum rollers being adapted so as to be in tangential contact with a cooperating roller on said cylinder member, each of said drum members being disposed within the tank so that when said tank is filled with electrolyte, only said drum rollers will be partially immersed in the electrolyte.

6. An apparatus for electrolytically marking a metallic tube comprising, a tank adapted to contain an electrolyte, a cylinder member including a core of electrical insulating material and rollers mounted on said core, each of said rollers including a rim surface portion adapted to be charged with electrolyte, and a metallic part recessed from said rim surface but in contact with electrolyte when retained on said surface, said cylinder member being disposed along a horizontal axis above the level of electrolyte when contained in the tank and adapted to be driven in rotation about said axis, a drum member being disposed at least partially within the tank along a horizontal axis and adapted to be driven in rotation about said axis, said drum member further being adapted to be partially immersed in electrolyte when contained in the tank and, upon rotation, to transmit electrolyte from the tank to the rollers of the cylinder member, means adapted to bring the metallic tube to be marked in contact with the electrolyte retained on said rollers when said rollers are charged with electrolyte, means adapted to provide bands of electrical insulating material, perforated beforehand so as to form a predetermined pattern, between said tube and the rollers of said cylinder member so that upon electrolytic treatment said tube will be marked according to said pattern, means adapted to drive said cylinder member and said drum member in rotation, and contact means to connect an electric current generator to said metallic tube and to the metallic part of each of said rollers.

7. A device according to claim 6 wherein each band of insulating material has a plurality of successive patterns and wherein said apparatus comprises means for transferring each of said bands between said tube and said cylinder member so as to insure that each of the patterns is capable of successively limiting said contact area.

* * * * *